J. WILKINSON.
MEANS FOR INCREASING THE VELOCITY OF FLUIDS FOR METERING PURPOSES.
APPLICATION FILED SEPT. 2, 1914.
1,145,222.
Patented July 6, 1915.
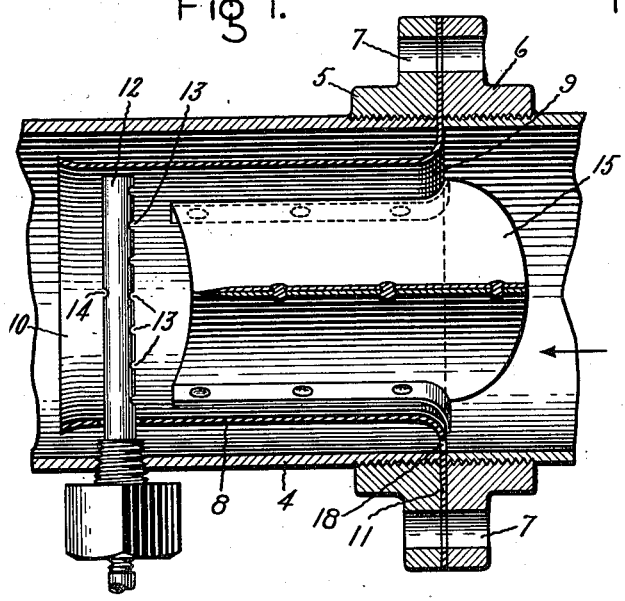
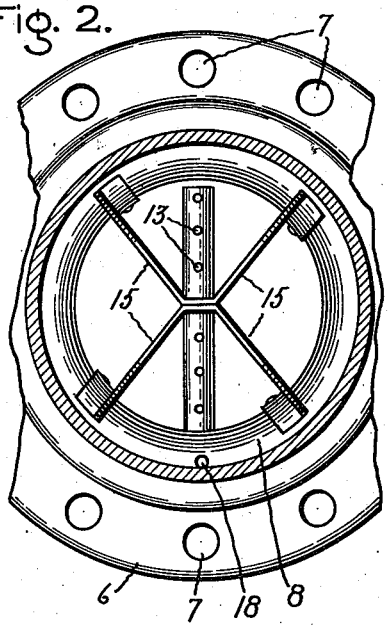
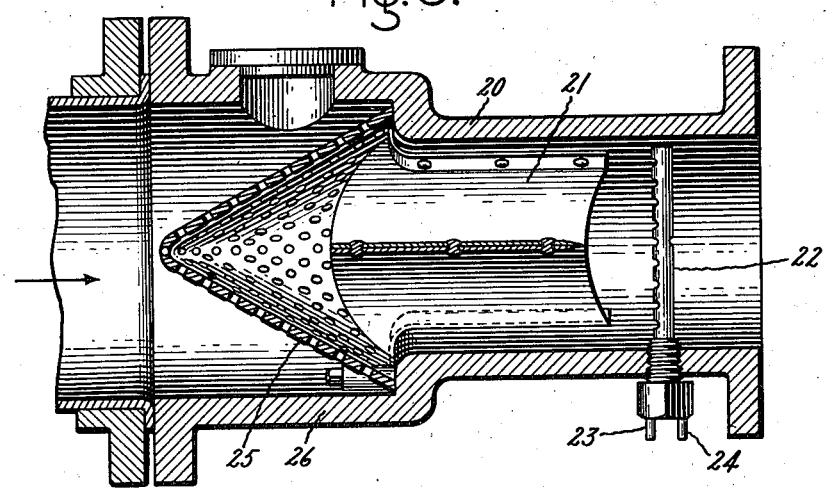
Witnesses:
Inventor,
James Wilkinson,
by
His Attorney.

UNITED STATES PATENT OFFICE.

JAMES WILKINSON, OF SCHENECTADY, NEW YORK, ASSIGNOR TO GENERAL ELECTRIC COMPANY, A CORPORATION OF NEW YORK.

MEANS FOR INCREASING THE VELOCITY OF FLUIDS FOR METERING PURPOSES.

1,145,222.     Specification of Letters Patent.     Patented July 6, 1915.

Original application filed July 12, 1913, Serial No. 778,759. Divided and this application filed September 2, 1914. Serial No. 859,823.

*To all whom it may concern:*

Be it known that I, JAMES WILKINSON, a citizen of the United States, residing at Schenectady, in the county of Schenectady, State of New York, have invented certain new and useful Improvements in Means for Increasing the Velocity of Fluids for Metering Purposes, of which the following is a specification.

This application is a division of my application, Serial No. 778,759, filed July 12, 1913.

The present invention relates to the metering of fluids flowing through a conduit and particularly to the metering of fluids flowing at low velocity, although it is not limited thereto.

The object of my invention is to provide an improved arrangement which will give very accurate results under all conditions of flow.

For a consideration of what I believe to be novel in my invention, attention is directed to the following specification and claims appended thereto.

Referring to the drawings, Figure 1 is a sectional view through a portion of a conduit showing my improved metering arrangement applied thereto. Fig. 2 is an end view looking toward the left of Fig. 1 and Fig. 3 is a view similar to Fig. 1 showing a modification.

Referring first to Figs. 1 and 2, 4 indicates a main or conduit for the fluid, such as steam, for example, which is uniform in cross-section and conveys fluid to an engine or other apparatus. The conduit is made in sections as usual and the adjacent ends are screw-threaded to receive parts 5 and 6 of the coupling. The parts of the coupling are flanged and provided with suitable openings 7 through which a suitable securing means may be passed. Located inside the pipe is a funnnel shaped nozzle or pipe reducer 8 which is designed in accordance with well known laws to gradually increase the velocity of the fluid from the inlet or up stream end 9 to the outlet or down stream end 10. After the steam or other fluid leaves the nozzle its velocity will be decreased to substantially the same value that it had prior to entering the nozzle and hence the losses in the pipe line will be no greater than they were before. The nozzle is provided with a flange 11 that is perpendicular to the axis of the nozzle. This flange acts as a support for the nozzle and may be located between the opposed faces of the pipe coupling. The nozzle will preferably be made of copper and either spun or pressed into the desired shape. The flange 11 should be made as thin as possible consistent with sufficient strength so that it will occupy little space, thereby avoiding the necessity of shortening one or both sections of the conduit 4. The flange 11 serves as a means for supporting the nozzle centrally within the conduit. Near the discharge end of the nozzle, an opening is provided to receive the nozzle plug 12, the latter being provided with a series of openings 13, facing the moving column of fluid and one or more orifices 14 that face in the opposite direction. These orifices 13 and 14 communicate through suitable conduits with the leading and trailing sides of a manometer instrument as is well understood in this art, the same acting on the principle of a Pitot tube to set up a pressure difference which bears a definite relation to the rate of flow of the fluid being metered.

In order to obtain accurate results with an arrangement of this character, it is necessary that the fluid flowing through the main or conduit should be directed against the pressure difference creating device, as the nozzle plug 12, in an even and uniform manner. It has been found in actual practice that there is often more or less eddying and unevenness of flow of the fluid, particularly where there are bends in the conduit or main and this has led to instruments giving results which are not wholly accurate. In order to overcome this difficulty and to produce greater evenness and uniformity in the flow of the fluid, I secure guiding or directing means in the nozzle or reducer 8. This guiding or directing means consists preferably of a series of dividing members or partitions 15 which separate the interior of the nozzle into a plurality of parallel paths. In the present instance these members are shown as comprising a pair of sheet metal members which are bent to a truncated V form and suitably fastened together and to the cylindrical wall of the retainer. In the present instance, I have shown the parts as being riveted but it will be understood that this is only by way of example and that any suitable means may be used. Whatever means is used, it is essential that the contour of the passage be as smooth and even as possible so as not to disturb the flow in any manner. Through the flange 11 inside the main or conduit is arranged a small drain opening 18 which, in case steam is being metered, allows any water in the pipes to pass. The guide members 15 preferably project some little distance beyond the inlet or up stream end of the nozzle or pipe reducer 8 as shown, thus acting to guide the fluid into the nozzle as well as direct it after it has entered the same. By the use of this guide means, I, in a sense, straighten out the flow so that the fluid is directed against the pressure difference creating device in straight parallel lines. It will be noted that the directing vanes terminate a short distance from the outlet or down stream end of the pipe reducer 8 and that the nozzle plug 12 is located just beyond the ends of the same. I find this to be a particularly advantageous arrangement.

Referring now to Fig. 3, I have shown a modified form of my invention wherein the pipe reducer or nozzle is formed as a special pipe section 20 inserted between two sections of the pipe line. This pipe section has a definite internal cross-sectional area and performs the same function and operates in the same manner as does the nozzle 8 shown in Fig. 1. The guide means 21 shown in this figure is similar to that shown in Fig. 1 and may be secured in place in any suitable manner. In this figure, 22 indicates the nozzle plug and 23 and 24 the leading and trailing pipes respectively, which connect with the manometer instrument. In connection with this form of the invention, I have shown a conical strainer 25 of cast or sheet metal pierced with numerous holes. This strainer is bolted in the enlarged chamber 26 of the pipe section 20 and is located on the approach side of the guide members 21. In addition to performing its ordinary straining functions, this strainer serves also to break up any eddying or irregular flow of the fluid.

By the above arrangement I am enabled to meter low velocity fluids of irregular flow in an accurate and efficient manner, the nozzle section or reduced pipe section operating to increase the velocity of flow so that it can be readily metered while the guiding and directing vanes act to direct the fluid in straight parallel and even lines upon the pressure difference creating device.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an apparatus for metering low velocity fluids, the combination with the conduit through which the fluid to be metered flows, of a funnel-shaped nozzle located in said conduit through which all the fluid flows, the larger end of said nozzle facing the direction of flow so that all the fluid in flowing through it has its velocity uniformly increased, fluid directing vanes fixed inside the funnel-shaped nozzle for directing the flow in straight parallel lines, and a pressure difference creating device arranged in said conduit adjacent the smaller end of said nozzle that is adapted to be acted on by the flowing fluid to create at such point a pressure difference responsive to changes in the rate of flow of the fluid to be metered, said device being acted on by the fluid after its velocity has been increased by the nozzle.

2. In a flow meter, the combination with a conduit through which the fluid to be metered flows, of a removable funnel shaped nozzle located in the conduit for increasing the velocity of flow and through which all the fluid to be metered flows, fluid directing vanes fixed inside the funnel shaped member for directing the flow in straight parallel lines, and a pressure difference creating device located in the end of the nozzle and beyond the directing vanes as regards the direction of flow.

3. In a flow meter, the combination with a conduit of uniform cross-section through which the fluid to be metered flows, of a funnel shaped nozzle located therein for increasing the velocity of flow and through which all the fluid to be metered flows, said nozzle having a flange at one end perpendicular to its axis by means of which it is fastened in the conduit, fluid directing vanes in the nozzle which extend from the up stream end of the nozzle to a point spaced from the other end thereof, and a nozzle plug projecting through the wall of the conduit and the said other end of the nozzle at a point adjacent the ends of the said directing vanes.

4. In a flow meter, the combination with a conduit of uniform cross-section through which the fluid to be metered flows, of a nozzle of smaller diameter than the conduit located therein and shaped to temporarily increase the velocity of the fluid passing through said conduit, fluid directing vanes carried by said nozzle and dividing the interior of the same into a plurality of parallel fluid directing passages, said fluid directing vanes extending from a point outside the up-stream end of the nozzle to a point short of the down-stream end of the nozzle and a pressure difference creating device inserted in said conduit adjacent the ends of the directing vanes.

5. In an apparatus for metering low velocity fluids, the combination with a conduit through which the fluid to be metered flows, of a member associated with said conduit and forming a short section of reduced diameter for increasing the velocity of flow and through which all the fluid to be metered flows, said member having an opening adjacent its down-stream end, fluid directing vanes in the said member which extend from the upstream end thereof to a point spaced from the other end and adjacent to said opening, and a nozzle plug projecting through said opening into the member so as to be acted upon by the fluid after its velocity has been increased.

In witness whereof, I have hereunto set my hand this 31st day of August, 1914.

JAMES WILKINSON.

Witnesses:
 JAMES MURRAY WEED,
 WILBUR A. PRESSEY.